June 22, 1965     A. T. C. BURROWS     3,190,617
ELECTRICALLY OPERATED HOISTS

Filed May 26, 1961     3 Sheets-Sheet 1

United States Patent Office 3,190,617
Patented June 22, 1965

3,190,617
ELECTRICALLY OPERATED HOISTS
Arthur Thomas Charles Burrows, Stevenage, England, assignor to Geo. W. King Limited, Stevenage, England, a British company
Filed May 26, 1961, Ser. No. 112,862
Claims priority, application Great Britain, May 27, 1960, 18,824/60
4 Claims. (Cl. 254—186)

This invention relates to electrically operated hoists and in accordance therewith it is proposed in a hoist unit incorporating an electric driving motor and winding drum to locate the motor within said drum thereby to reduce the overall length of the hoist unit. The construction will preferably be such that it will be possible without undue difficulty to withdraw the motor from the drum when required for maintenance or repair.

In order that the invention may be clearly understood and readily carried into effect the same will be hereinafter more fully described with reference to the accompanying drawings in which.

Figure 1:
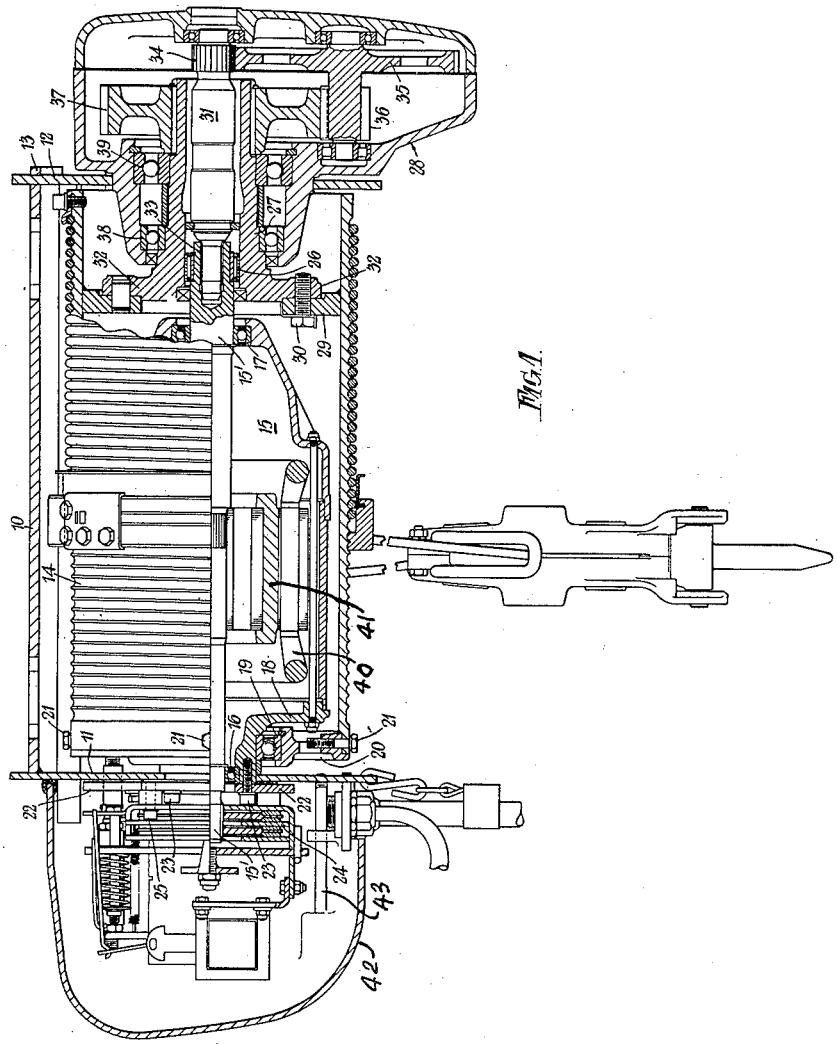
FIGURE 1 is a longitudinal section view of an electrically operated hoist unit.
Figure 2:
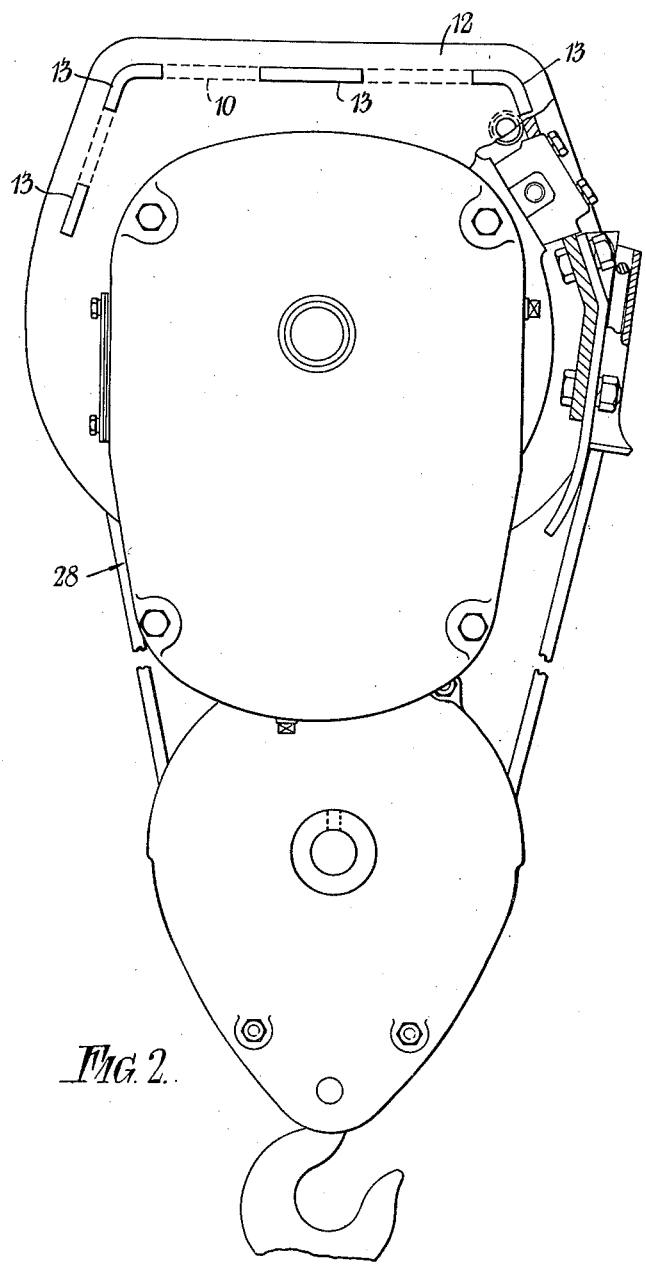
FIGURE 2 is an end view looking from the right of FIGURE 1.

Referring to the drawings it will be seen that the hoist unit illustrated includes a main supporting frame comprising a longitudinal member 10 approximating an inverted U shape in cross section and end plates 11 and 12, the plate 11 being fixedly secured to the member 10 while the plate 12 is removable and is provided with slots so positioned as to receive tongues 13 formed on the aforesaid longitudinal member. The frame serves to support a hollow winding drum 14 which in turn serves to house an electric driving motor 15 having a stator winding 40 and a rotor 41 which is mounted on an output or drive shaft 15'. The output shaft 15' of the motor 15 is journalled in bearings 16 and 17, which are supported in a motor cover 18. Located on the cover 18 is an anti-friction bearing 19 which in turn serves to support an annular drum end plate 20 to which one end of the drum is attached by means of bolts or the like 21. To maintain the left hand end (as shown) of the motor and drum assembly in position in the frame an annular plate 22 is provided which is secured to the motor cover 18 by means of four screws, two of which are indicated at 23. 24 denotes a brake unit which is of known type and is applied to the left hand end of the motor shaft 15 as shown, said unit being adapted to be held in place to plate 22 by means of four screws one of which is indicated at 25. The brake unit is enclosed within a housing 42 which is secured in place by bolts, one of which is indicated at 43, threaded into appropriately threaded apertures on the end plate 11.

At its other end i.e. the right hand end as shown, the motor shaft 15' is supported in a needle roller bearing 26 which is in turn supported in a sleeve member 27. The sleeve member 27 is supported in a transmission which is designated generally by 28 which is supported by the removable end plate 12 of the frame. As will be seen the right hand end of the drum 14 as shown is supported by virtue of the provision of an internal ring or the like 29 which is welded in place within said drum and is connected by means of bolts or the like as indicated at 30 to a radial flange 32 on the inner end of the aforesaid sleeve member 27. The motor shaft 15' is drivingly coupled to the input pinion shaft 31 of the transmission by means of suitable splines indicated at 33 the arrangement being such that said shaft 15' may be disconnected from said pinion shaft 31 as a result of an axial sliding movement relative thereto.

It will be appreciated that with the construction as shown in FIGURE 1 operation of the motor 15 will result in a drive being transmitted to the sleeve member 27 and hence to the drum 14 via the shafts 15', 31, pinion 34, spur wheel 35, pinion 36 and a spur wheel 37 which latter is splined or keyed to said member 27 the latter being rotatably journalled within the transmission by means of bearings 38, 39.

The construction is such that when it is required to remove the motor 15 from the drum 14 for maintenance or repair the following procedure is followed.

Firstly the brake unit 24 will be removed as a complete unit upon removal of the housing 42 and subsequently of the four retaining screws 25 whereafter it will be possible by withdrawal of the screws 23 to remove the plate 22. At this stage the winding drum 14 and motor 15, the transmission 28 and the end plate 12 may be withdrawn from the main supporting frame 10. If now the complete assembly thus removed is stood on end with the winding drum 14 vertically above the transmission 28 the bolts or the like 21 may readily be removed to thereby detach the drum end plate 20 from the drum. At this point the drum end plate 20 and the motor 15 can be withdrawn from the drum 14, the motor shaft 15' sliding axially clear of the needle roller bearing 26 and also of the splines 33 of the gearbox input pinion shaft 31.

It may be pointed out here that in order to provide for lower speeds of lift than that normally adopted one or more trains of auxiliary gears may be interposed between the pinion 34 on the transmission input pinion shaft 31 and the first spur wheel 35 of the transmission train. For example the input shaft to the transmission may be arranged to pass freely through the normal input pinion 34 and a new input pinion may be mounted thereon, such new pinion being arranged to mesh with a spur wheel forming one train of gears which is adapted to turn to drive a second train of gears, the spur wheel of which is arranged centrically with and attached to the normal input pinion 34. Alternatively the pinion 34 may be removed from the input shaft 31 which may be extended through the end of the gearbox to carry an input pinion meshing with a new spur wheel. This spur wheel will be mounted concentrically with a pinion to drive the spur wheel 35 hitherto driven by the pinion 34. The new train of gears would of course be disposed externally of the transmission cover as shown in the drawing and either the cover would have to be enlarged to include the new gearing or modified to receive a small secondary transmission.

Figure 3:
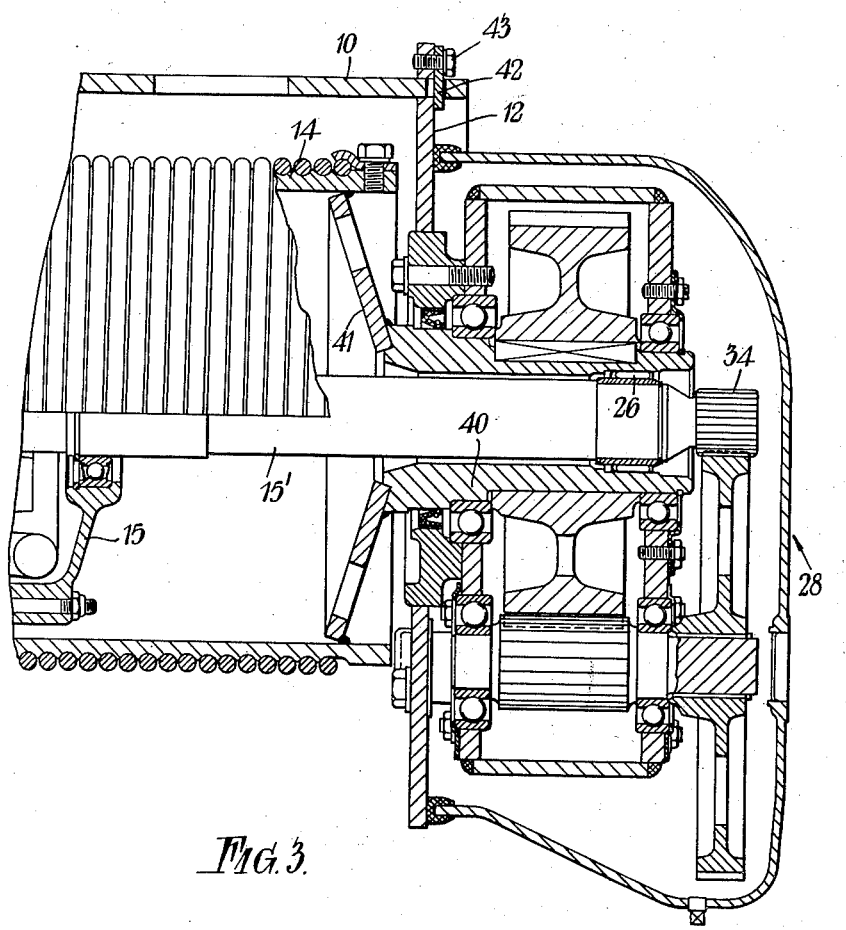
FIGURE 3 is a view corresponding to the right hand end of FIGURE 1 but illustrating a modified construction.

Referring now to FIGURE 3, therein is illustrated a modified drive transmission arrangement and also a different method of supporting the adjacent end of the winding drum 14. The manner of supporting the other end of the drum and the other features of construction of the hoist unit are generally similar to those described and illustrated in FIGURE 1. In the case of the embodiment shown in FIGURE 3 the motor shaft 15' is extended as compared with the construction illustrated in FIGURE 1 and carries at its outer end the input pinion 34 of the transmission which is again designated generally by 28. As will be seen the outer end of the shaft 15' is again supported in needle bearings 26 located within a sleeve member 40 corresponding to the member 27, of FIGURE 1. In FIGURE 3 however the member 40 has welded thereto a conically shaped disc or plate 41 which is welded at its periphery to the inner surface of the drum 14 and this serves to support the latter. In the embodiment illustrated in FIGURE 3 the end plate 12 is detachably secured to the main frame member 10 by means of keeper plates 42 which are secured in place by means of bolts 43.

With the construction shown in FIGURE 3 when it is required to remove the motor 15 for maintenance and repair, the keeper plate 42 will be removed whereafter the winding drum 14 and motor 15, the transmission and the end plate 12 will be withdrawn from the supporting frame in precisely the same way as described with reference to FIGURE 1, thereby to allow detachment of the drum end plate (i.e. the plate 20 of FIGURE 1) and subsequent removal of the latter and the motor 15 from the drum 14. In the case of the embodiment shown in FIGURE 3 the motor shaft 15' together with the pinion 34 will slide axially clear of the first spur wheel of the gear train and also of the needle bearings 26 carried by the member 27.

It may be pointed out here that in the case of the two constructional embodiments above described and illustrated there will be no difficulty in maintaining alignment between the transmission, drum and brake unit since the arrangement is such that these units will effectively constitute a rigid beam which only requires to be supported at two points i.e. by the end plates 11, 12 of the frame 10.

What is claimed is:

1. An electrically operated hoist comprising a frame including spaced end plates at least one of which is detachable, a hollow winding drum located between said end plates and free of said frame and plates, an electrical motor within said drum and including a cover and a drive shaft rotatable in said cover, transmission means including an outer housing supported on the detachable one of said end plates, said transmission means including an input shaft, means defining a splined connection drivingly coupling the drive shaft of the motor to the input shaft of the transmission means to enable relative axial movement between the drive shaft and the input shaft of the transmission means, a further plate adjacent the other of said end plates and detachably secured to one end of the cover of the motor, said cover being slidably supported at said one end by projecting through a central aperture in the other of the end plates of the frame, a brake unit mounted on said drive shaft and detachably secured to the further plate for exerting braking forces on said drive shaft, a sleeve rotatably mounted on the drive shaft and secured to one end of the winding drum, said sleeve extending within the housing of the transmission means, means rotatably supporting the sleeve within the housing of the transmission means, said transmission means including gearing in driving connection with said input shaft and said sleeve whereby the drive shaft of the motor can drive the gearing of the transmission means while the latter can in turn drive the winding drum via said sleeve, and means rotatably supporting the other end of the drum on the cover of the motor at a location adjacent the said other end plate, said brake unit, transmission means and drum and motor constituting a rigid assembly supported from said frame only by said two end plates whereby with the further plate detached from the said one end of the cover of the motor, the motor, drum and transmission means may be removed as a rigid unit from the frame by detaching said one end plate and axially sliding said rigid unit in a direction away from said other of said end plates.

2. A hoist as claimed in claim 1, wherein said means rotatably supporting the drum on the cover of the motor comprises an annular member rotatably supported on said cover of said motor and detachably coupled to said drum.

3. A hoist as claimed in claim 2, wherein said sleeve includes a flange extending perpendicularly to said drive shaft of said motor in a radially outwardly direction, the hoist further including fastener means detachably coupling said flange of the sleeve to said drum.

4. A hoist as claimed in claim 1 comprising a conical element secured to the sleeve and to the drum to secure the same together.

References Cited by the Examiner

UNITED STATES PATENTS

| 1,146,339 | 7/15 | Matthews | 254—150 |
|---|---|---|---|
| 1,637,818 | 8/27 | Hawkins | 254—150 |
| 1,701,017 | 2/29 | Shepard | 254—186 |
| 1,738,811 | 12/29 | Wilsing | 254—173 |
| 1,898,753 | 2/33 | Wente | 74—660 |
| 2,247,795 | 7/41 | Whitcomb et al. | 254—168 |
| 2,891,767 | 6/59 | Armington | 254—168 |
| 2,947,517 | 8/60 | Simonsen | 242—117 X |
| 3,042,375 | 7/62 | Fahey et al. | 254—187 |

SAMUEL F. COLEMAN, *Primary Examiner.*

LELAND M. MARTIN, *Examiner.*